US009573291B1

(12) United States Patent
Hurdle

(10) Patent No.: US 9,573,291 B1
(45) Date of Patent: Feb. 21, 2017

(54) CHAIN DRIVE SYSTEM FOR TONG DOG CARRIERS

(71) Applicant: Ennis J. Hurdle, Collierville, TN (US)

(72) Inventor: Ennis J. Hurdle, Collierville, TN (US)

( * ) Notice: Subject to any disclaimer, the term of this patent is extended or adjusted under 35 U.S.C. 154(b) by 488 days.

(21) Appl. No.: 14/281,713

(22) Filed: May 19, 2014

Related U.S. Application Data

(60) Provisional application No. 61/825,012, filed on May 18, 2013.

(51) Int. Cl.
*B23P 21/00* (2006.01)
*B27B 29/10* (2006.01)
*B27B 29/08* (2006.01)

(52) U.S. Cl.
CPC ............... *B27B 29/10* (2013.01); *B27B 29/08* (2013.01)

(58) Field of Classification Search
CPC ........... B23Q 3/06; B23Q 3/061; B23Q 3/005; B23Q 3/154; B23Q 1/02; B23Q 1/03; B23Q 1/30; B23P 15/34; B23P 15/28; B27B 3/00; B27B 3/20; B27B 5/00
See application file for complete search history.

(56) References Cited

U.S. PATENT DOCUMENTS 2,703,117 A * 3/1955 Elenbaas ................. B27B 29/08 269/30
3,782,711 A * 1/1974 Montgomery .......... B27B 29/08 269/31
3,797,349 A * 3/1974 Smith ....................... B27B 1/00 269/54.2
3,858,868 A * 1/1975 Zagray .................... B27B 29/08 269/164
4,515,196 A 5/1985 Shields
4,665,786 A 5/1987 Shields
5,638,878 A * 6/1997 Weirathmueller ........ B27L 1/10 144/208.1
5,680,802 A * 10/1997 Murray ................ B23D 59/001 144/215.2
5,950,517 A * 9/1999 Yoder ................... B27B 29/085 144/250.24
6,598,477 B2 7/2003 Floyd
6,705,363 B2 3/2004 McGehee et al.
6,996,497 B2 2/2006 Floyd et al.
7,712,494 B2 5/2010 Janzen
7,967,043 B2 6/2011 Miller et al.
7,997,309 B2 8/2011 Isley et al.
8,727,099 B2 5/2014 Saastamo
2010/0206436 A1* 8/2010 Cordell ................... B27B 31/04 144/357

* cited by examiner

*Primary Examiner* — Lee D Wilson

(74) *Attorney, Agent, or Firm* — Wyatt, Tarrant & Combs, LLP

(57) ABSTRACT

A novel sawmill carriage knee and dog positioning system using a chain knee drive that allows vertical access to chain tension adjustment screws, provides a chain mounting attachment plate connected to an adequately sized air cylinder attached to a dogs in/out carrier slide increasing structural rigidity and reducing component count, weight and unit cost, and providing a novel method to taper the knees relative to the sawline.

4 Claims, 18 Drawing Sheets

CHAIN DRIVE SYSTEM FOR TONG DOG CARRIERS

CROSS-REFERENCE TO RELATED APPLICATION

This application claims priority of U.S. Provisional Patent Application 61/825,012, filed on May 18, 2013, the teachings and disclosure thereof herein entirely incorporated by reference.

FIELD OF THE INVENTION

A novel sawmill carriage knee and dog positioning system using a chain knee drive that allows vertical access to chain tension adjustment screws, provides a chain mounting attachment plate connected to an adequately sized air cylinder attached to a dogs in/out carrier slide increasing structural rigidity and reducing component count, weight and unit cost, and providing a novel method to taper the knees relative to the sawline.

BACKGROUND OF THE INVENTION

A sawmill carriage is generally made up of movable knees providing a vertical surface against which a log rests may rest against and movable dogs used to clamp and hold the log while the carriage reciprocates back and forth along a track parallel to a saw blade. Before each pass, the log may be moved, or "jogged" toward or away from the saw blades or set. The jogging is generally accomplished by horizontal movement of the knees toward or away from the saw blades, to the desired thickness of the cut board desired to be produced from the log. The board is cut as the log advances through the saw. This process continues until the operator or "sawyer" decides to unload what is left of the log, the left-over piece generally referred to as a "cant" or "dog-board."

One dog, a "tong dog" system, comprises of an upper dog, a lower dog, a mechanism to bring the dogs together and a mechanism to move the dogs horizontally away from or towards the vertical surface of the knee. The knees themselves advance toward or away from the saw line, and is most commonly driven by a chain or rack gear.

The chain drive mechanism has several advantages over the rack gear system, making it the desirable mechanism by which to move the knees. The tong dog systems that use a rack gear to position the knees relative to the sawline are generally difficult to replace, not easy to adjust, and must have slack built-in even when the system is new. Comparatively, a chain drive system is easily adjustable, durable and easy to replace as wear necessitates.

A chain drive system must have a mechanism by which to tension the chain. As the chain drive system components and chain rollers wear, the chain will loosen and must be adjusted to prevent excessive slack. The chain tensioning mechanism adds to the complexity of the sawmill carriage, increasing the number of components necessary and necessitates a carriage structure sufficient for the force transfer from the log though the dogs and dog adjustment mechanism, through the knee components to the chain drive. A need exists for a chain drive system having a fewer components, is simple to service and adjust and provides for an efficient force transfer from the log to the chain drive to reduce number of stressed components in the sawmill carriage.

ADVANTAGES AND SUMMARY OF THE INVENTION

One distinct advantage of the inventive device is the capability thereof to function independently of any other device on demand during a sawmill tapering operation. Another advantage is the ability for such a unique device to provide sufficient strength and grip to a tapering arm while manipulating a separate tapering arm in order for a selective taper position to be established on demand (and on sight, for that matter) by an operator. Thus, another advantage of this invention is the provision of a total system that permits selective tapering positioning for more effective and efficient sawmill operations, such that, at least, greater utilization of desired wood materials of necessary configuration is permitted.

Accordingly, the present invention encompasses a novel sawmill carriage chain drive tensioning mechanism that allows vertical access to the chain tension adjustment screws and providing a mounting attachment point upon the same member used for chain tensioning thus reducing the amount of components having to bear the dog load during adjustment, increasing rigidity and reducing component weight and unit cost.

The chain drive system is preferably for use with a tong dog carriage comprising a special chain adjustment plate attached to a knee base plate and attached to an in/out dog cylinder, drive chain with an adjustment bolt attached to each end, drive sprocket and an idler sprocket. The chain adjustment plate serves as an anchor for the in/out dog cylinder and the end connector for the chain while allowing adjustments to be made to both tension and, in the preferred embodiment, to move the knee incrementally toward or away from the saw blade. The large, 4-5 inch pneumatic in/out dog cylinder allows tapering of the log cut to occur with accuracy and ease of adjustment while minimizing the overall unit cost.

BRIEF DESCRIPTION OF THE DRAWINGS

The invention is illustrated by the accompanying drawings, in which.

DETAILED DESCRIPTION OF THE INVENTION

The drawings illustrate a sawmill carriage unit for cutting a log into lumber. The carriage moves linearly upon a rail or track allowing a saw blade, or plurality of saw blades to cut the log into boards of a desired thickness. It should be understood that the saw blade may be a circular saw blade, a band saw blade or any other blade suitable for cutting a log.

Figure 1:
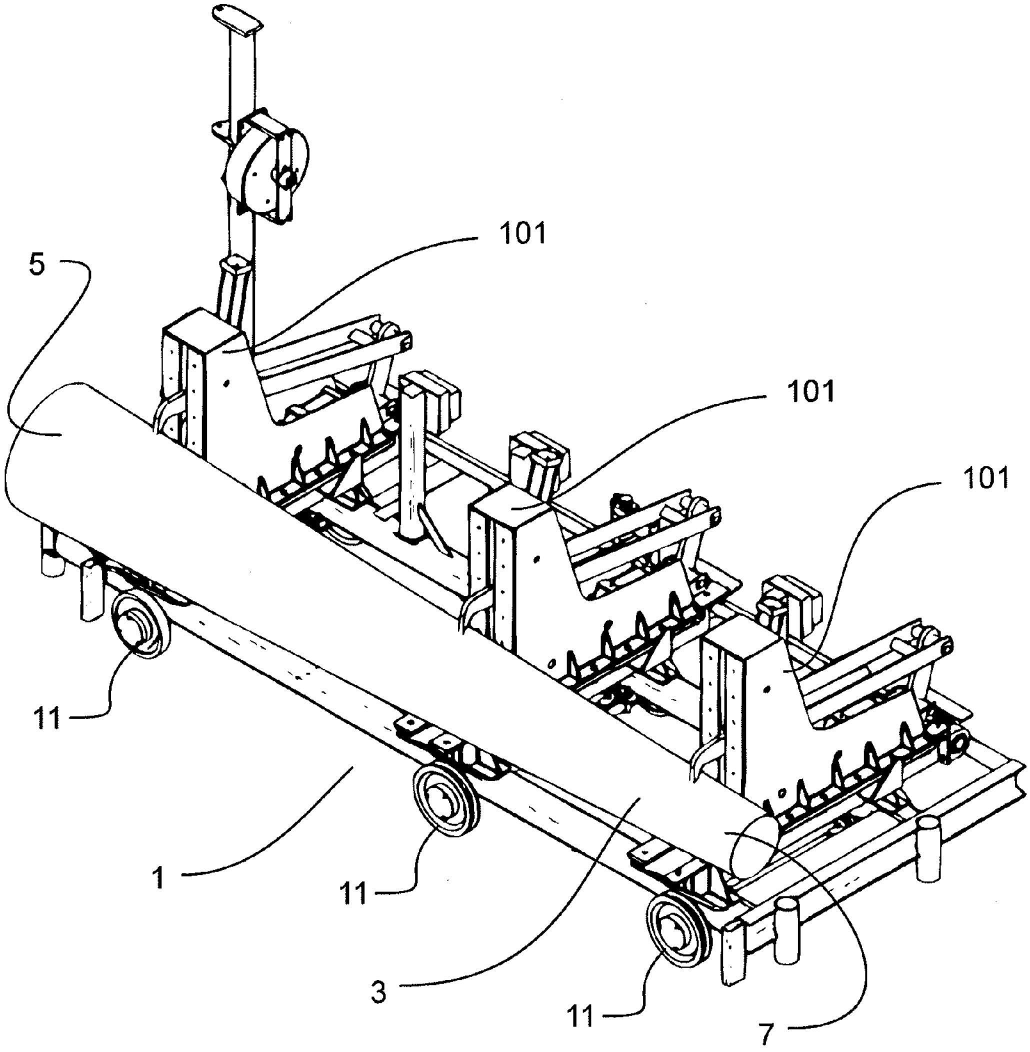
FIG. 1 is a perspective view of an embodiment of the sawmill including the sawmill carriage and log.

FIG. 1 shows a sawmill carriage 1 and log 3 to be cut. The sawmill carriage 1, having movable knees 101 with built-in movable dogs (203, 205 of FIG. 2) is used to clamp and hold the log 3. The carriage wheels 11 rest upon a track (not shown) parallel to a saw blade. The carriage 1 reciprocates back and forth along the track parallel to a saw blade. Before each pass through the saw, the knees 101 can be “jogged” toward or away from the saw or “set” which advances the knees 101 toward the saw an amount equal to the desired thickness of a board. The board is cut from the log as the log 3 advances through the saw. This process continues until the sawyer decides to unload the remainder of the log 3, the remainder of the log generally referred to as a “cant” or “dogboard”.

In general, most all logs are tapered from one end to the other, as the log 3 shown in FIG. 1 is tapered from a wide end 5 to a narrow end 7. For each log, the sawyer must choose how to taper or pivot (i.e. position) the log relative to the saw. The sawyer will move the small end 7 of the log 3 closer to the saw or the large end 5 of the log 3 away from the saw when adjusting the taper before cutting.

Figure 2:
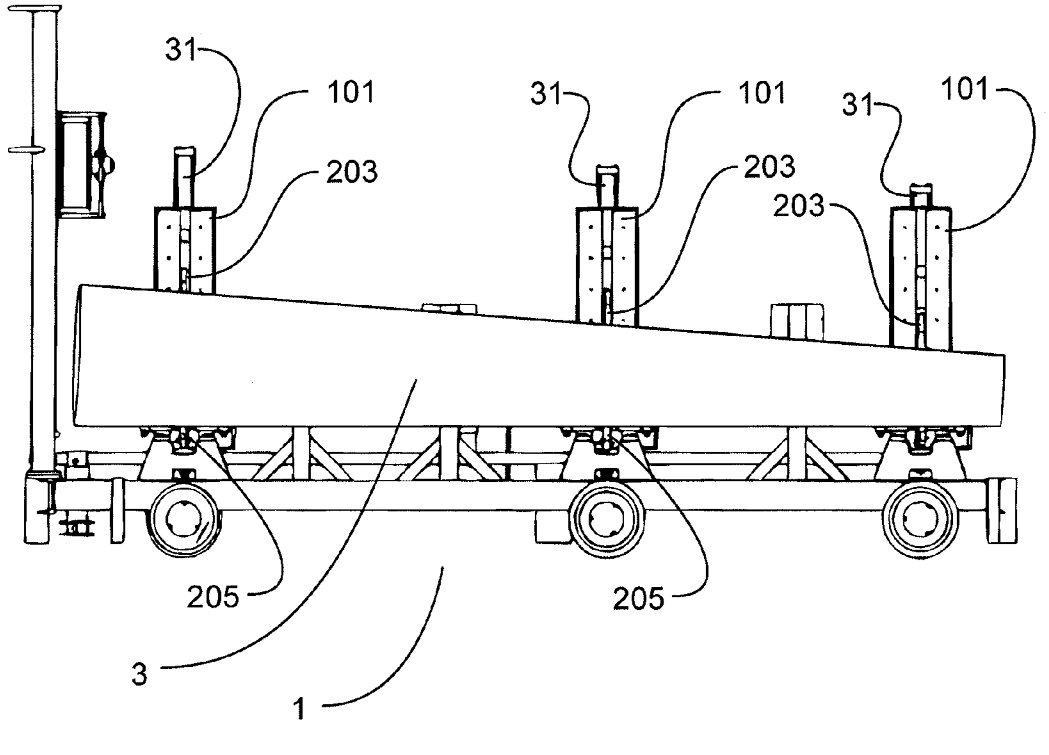
FIG. 2 is a front view of the sawmill including the sawmill carriage and log shown in FIG. 1.

FIG. 2 shows a front view of the invention 1. The preferred embodiment of the invention uses a plurality of pairs of opposing dogs 203, 205 extending from the front face (103 of FIG. 3) of each knee 101. Each pair of opposing dogs comprises an upper dog 203 and an opposing lower dog 205. The dogs 203, 205 move towards each other to clamp onto the log 3, by means of an actuator or cylinder, preferably a pneumatic air up/down cylinder 31.

Figure 3:
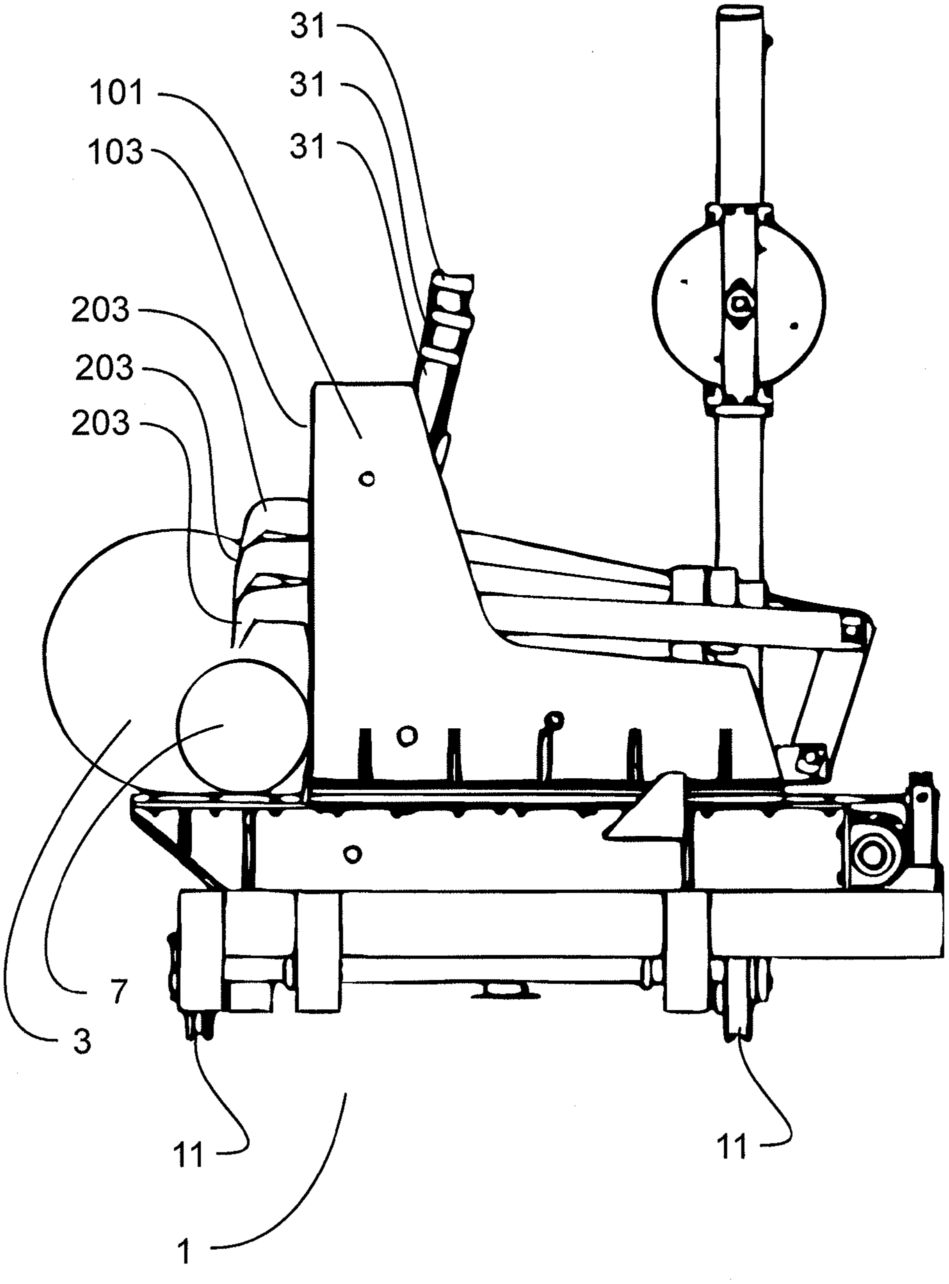
FIG. 3 is a side view of the sawmill including the sawmill carriage and log shown in FIG. 1.

FIG. 3 shows a side view of the invention showing the right most knee 101 and narrow end 7 of the log 3. The dogs 203, 205 are shown in a clamped down position, extending from the front face 103 of each knee 101.

Figure 4:
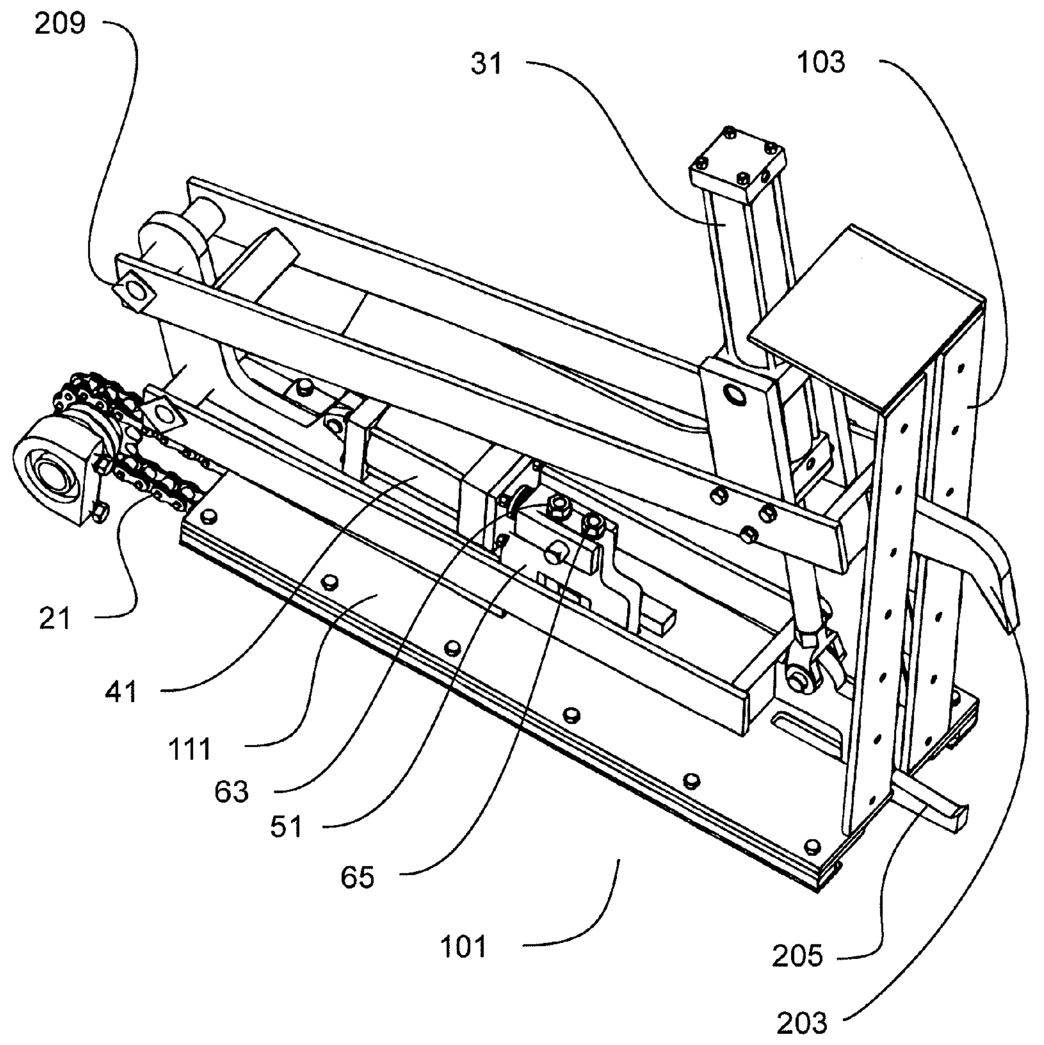
FIG. 4 is a top front perspective view of the knee, chain drive and tong dog assembly with the tong dog in the extended position.

FIG. 4 shows a front top side perspective view of a knee 101 showing an in/out cylinder 41 attached to a chain tension adjustment plate 51. The chain adjustment plate 51 allows adjustment of the tension of the chain 21 by tightening or loosening an adjustment bolt. In the preferred embodiment, shown here, there are two adjustment bolts, the first bolt 63 attached to a first end of the chain 21 and a second bolt 65 attached to a second end of the chain 21 allow adjustment of the chain 21 both for tension and also horizontal position of the knee relative to the other knees. To adjust tension or remove slack, tighten both adjustment bolts 63, 65 equally. When a plurality of knees are driven by a common actuator, it is desirable to be able to adjust the knees in small increments so as to be able to align the front face of each knee in plane with one another. Having one chain adjustment screw on either end of the chain enables a user to make small adjustments to ensure each knee is properly aligned. This is accomplished by tightening one bolt while simultaneously loosening the other 63, 65. The vertical position of the bolts 63, 65 provide easy access. The adjustment plate is secured to the knee base plate 111 and attached to the in/out cylinder 41 preferably by a pinned connection 233.

The in/out cylinder 41 is preferably a pneumatic cylinder having a minimum diameter of 4 to 5 inches. The in/out cylinder 41 in the preferred embodiment is larger than is typically used for positioning of dogs in a traditional sawmill, but the added diameter greatly aids in maintaining the dog 203, 205 position when adjusting the knees to taper the log to the desired angle. The chain adjustment plate 51 position and narrow profile provides space to use an adequately sized in/out cylinder 41, capable of holding log in a tapered position, which is critical to the novel method of tapering presented later.

In the preferred embodiment, the in/out cylinder 41 is a pneumatic cylinder allowing rapid adjustment of the dogs 203, 205, and when compared to other actuators such as a hydraulic actuators, the pneumatic system is less expensive, faster acting and reduces the likelihood of oil contamination of the wood. The lower dog 205 is slide-ably retained to the knee base plate 111 while the upper dog 203 is retained by a pin connection 215 to the lower dog 205. In this figure, the dogs 203, 205 are in an extended position.

Figure 5:
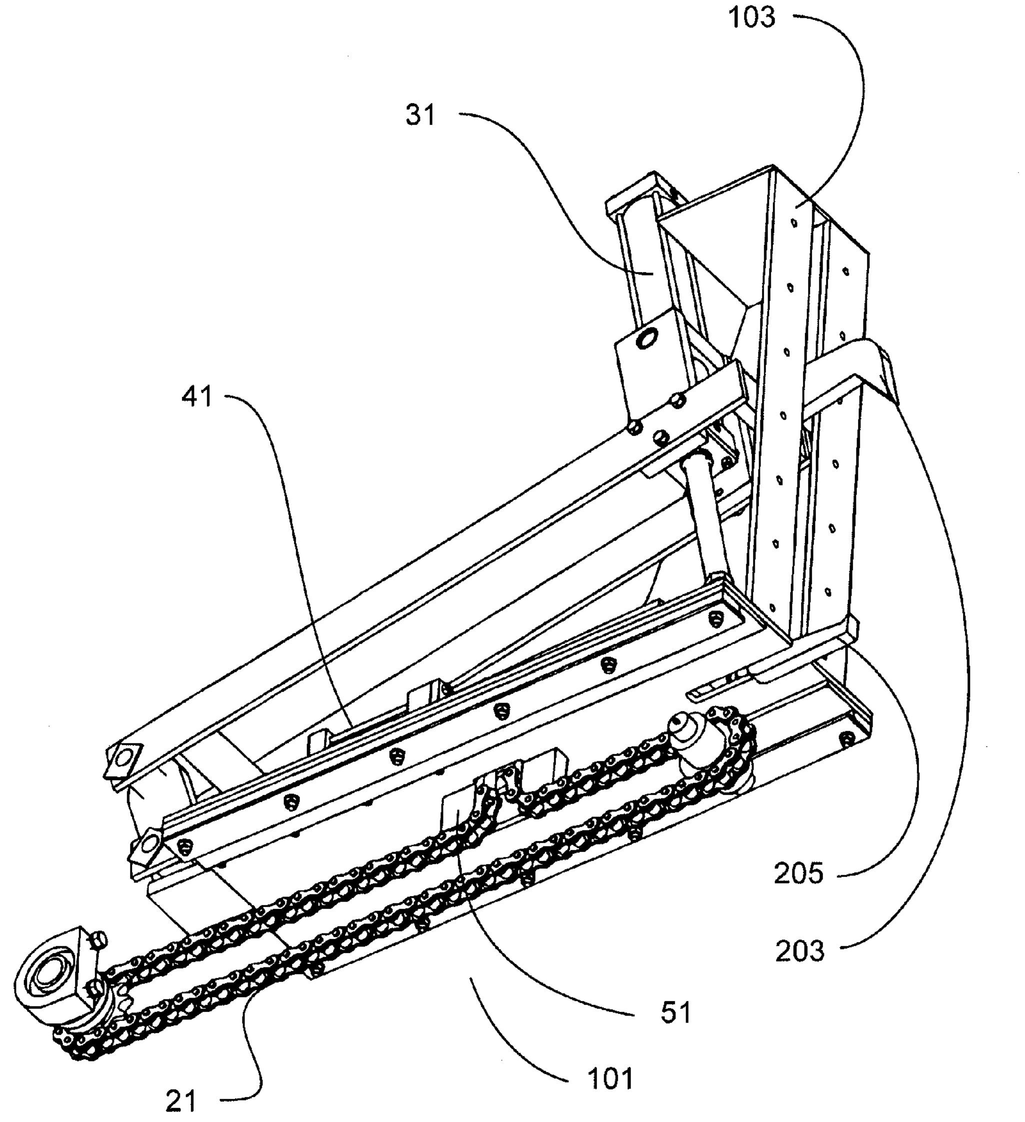
FIG. 5 is a bottom front perspective view of the knee, chain drive and tong dog assembly shown in FIG. 4.

FIG. 5 shows a front bottom side perspective view of the knee shown in FIG. 4 showing the chain 21 bottom of the knee base plate 111, base plate guides 113, 115 and the lower portion of the chain tension adjustment plate 51. The chain tension adjustment plate 51 extends downwardly past the knee base plate 111 allowing the chain to travel in a linear direction between a first sprocket 81 and a second sprocket or idler pulley 83. The second sprocket may possess teeth, or may be without teeth. A hydraulic motor 85 may be used to move the knee toward or away from the saw cut plane.

Figure 6:
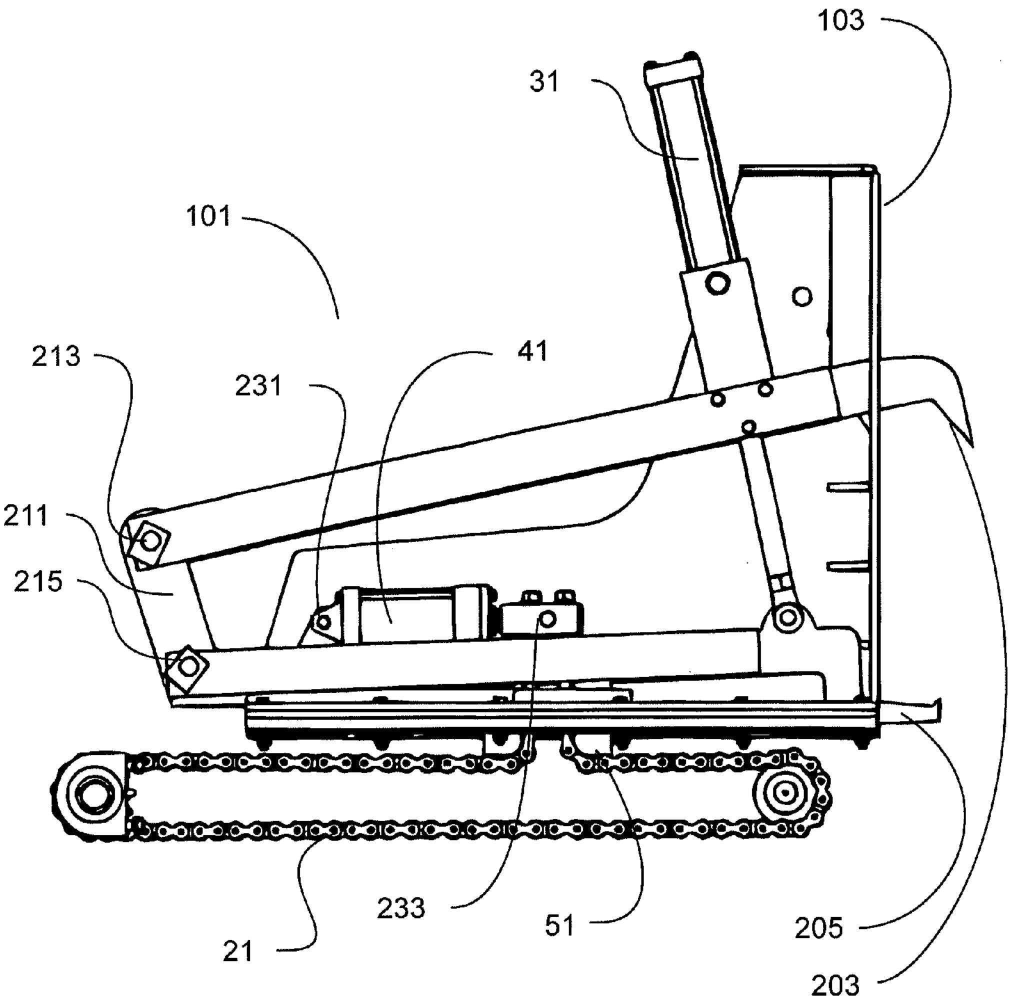
FIG. 6 is a side view of the knee, chain drive and tong dog assembly with the tong dog in the extended position.

FIG. 6 shows a side view of the knee shown in FIGS. 4 and 5. In the preferred embodiment, the upper dog 203 is connected to an intermediate connecting member 211 by an upper pin connection 213 and the lower dog 205 is connected to the intermediate connecting member 211 by a lower pin connection 215. In the preferred embodiment, the in/out cylinder 41 is connected to the intermediate connecting member 211 by a pin connection 231 on a first end of the cylinder 41 and to the chain adjustment plate 51 by a pin connection 233 on a second end of the cylinder 41. The up/down cylinder 31 is rigidly connected to the upper dog 203 and pin connected to the lower dog 205. The in/out cylinder 41 extends, pushing against the chain adjustment plate 51 and intermediate connecting member 211 which moves the dogs 203, 205 toward the knee front face 103. When the in/out cylinder 51 contracts, it pulls against the chain adjustment plate 51 and intermediate connecting member 211 moving the dogs 203, 205 away from the knee front face 103.

Figure 7:
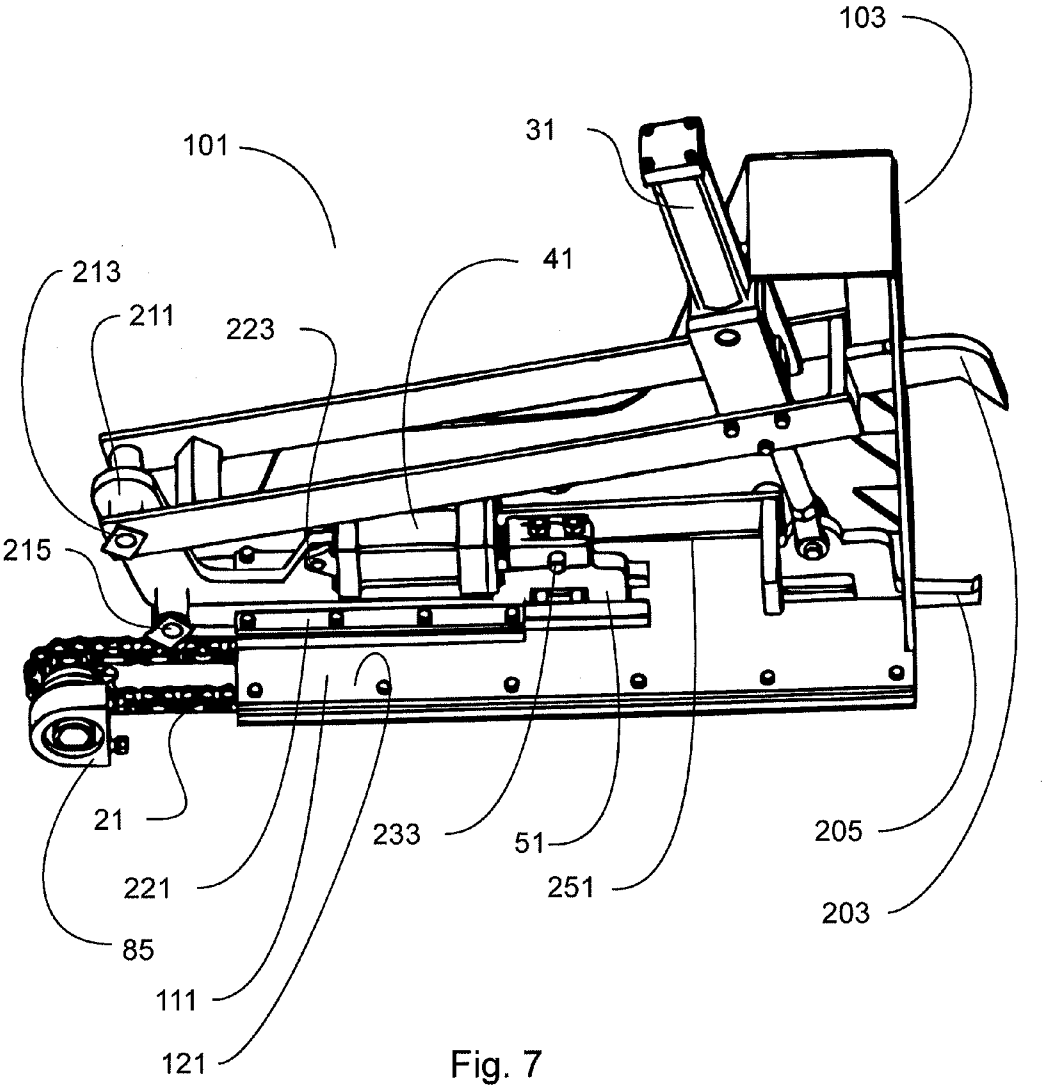
FIG. 7 is a top perspective view of the knee, chain drive and tong dog assembly shown in FIG. 6 with the lower dog left support member removed.

FIG. 7 shows a top perspective view of the knee assembly 101 showing the dogs 203, 205 in an unclamped, extended state. The right lower dog horizontal member 251 is shown but the left lower dog horizontal member is not shown for clarity. The intermediate connecting member 211, linearly slides along the knee base plate 111 allowing the dogs 203 205 to move toward and away from the knee front face 103. In the preferred embodiment, the intermediate connecting member guides 221, 223 retain the intermediate connecting member base plate 212 (FIGS. 11, 12, and 13) which is rigidly attached to the intermediate connecting member 211 and allow the horizontal linear movement of the intermediate connecting member 211 when pushed or pulled by the in/out cylinder 41. The chain 21 anchors the chain adjustment plate 51 in place. The chain 21, and also with it, the knee 101 and dogs 203, 205, can be moved as a unit by the operator to a desired position by a hydraulic motor 85.

Figure 8:
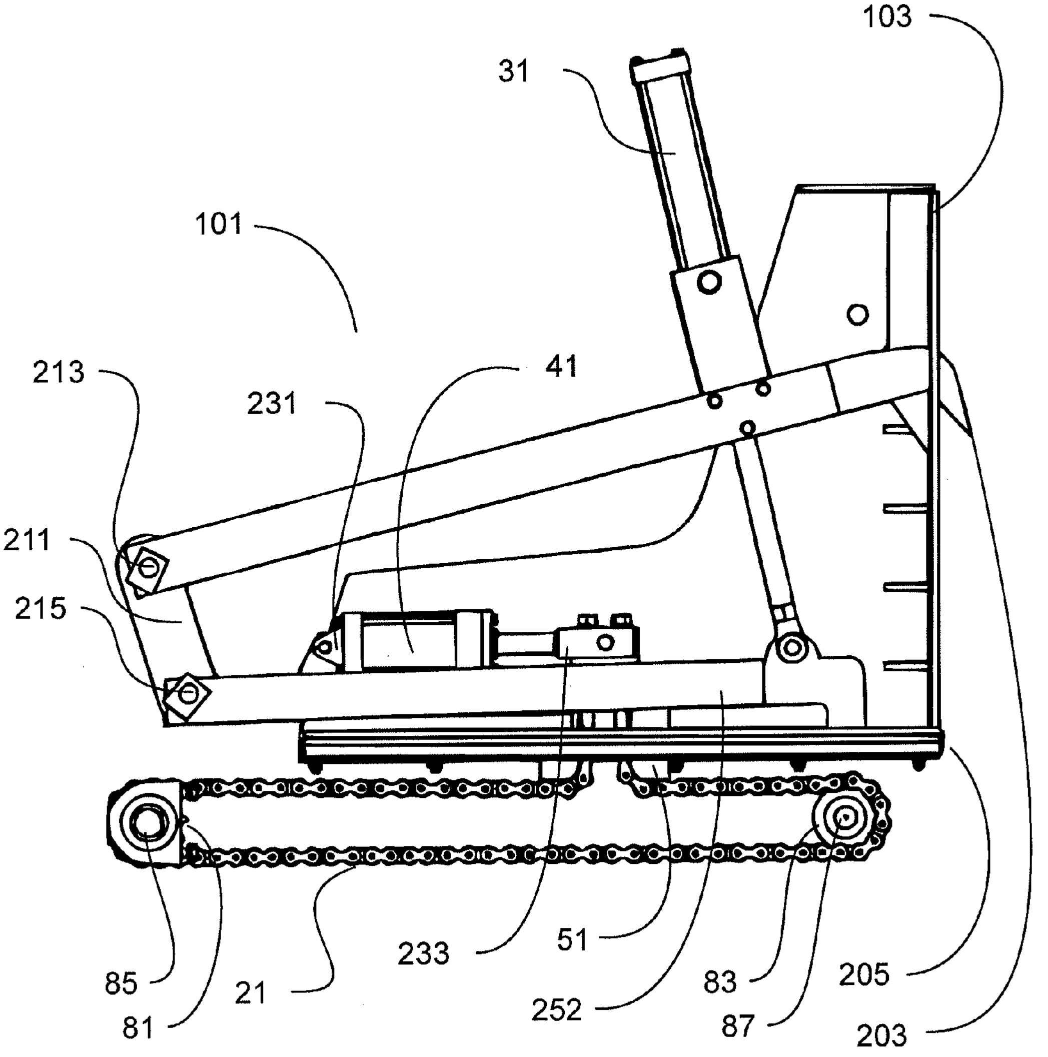
FIG. 8 is a side view of the knee, chain drive and tong dog assembly with the tong dog in the retracted position.

FIG. 8 shows a left side view of the knee 101 with the dogs 203, 205 in an open, retracted position, pulled close to the knee face 103. An idler pulley 87 attached to a second sprocket 83 placed opposite of the chain actuator 85 and first sprocket 81 allow horizontal movement of the knee 101. The left lower dog horizontal member 255 is shown.

Figure 9:
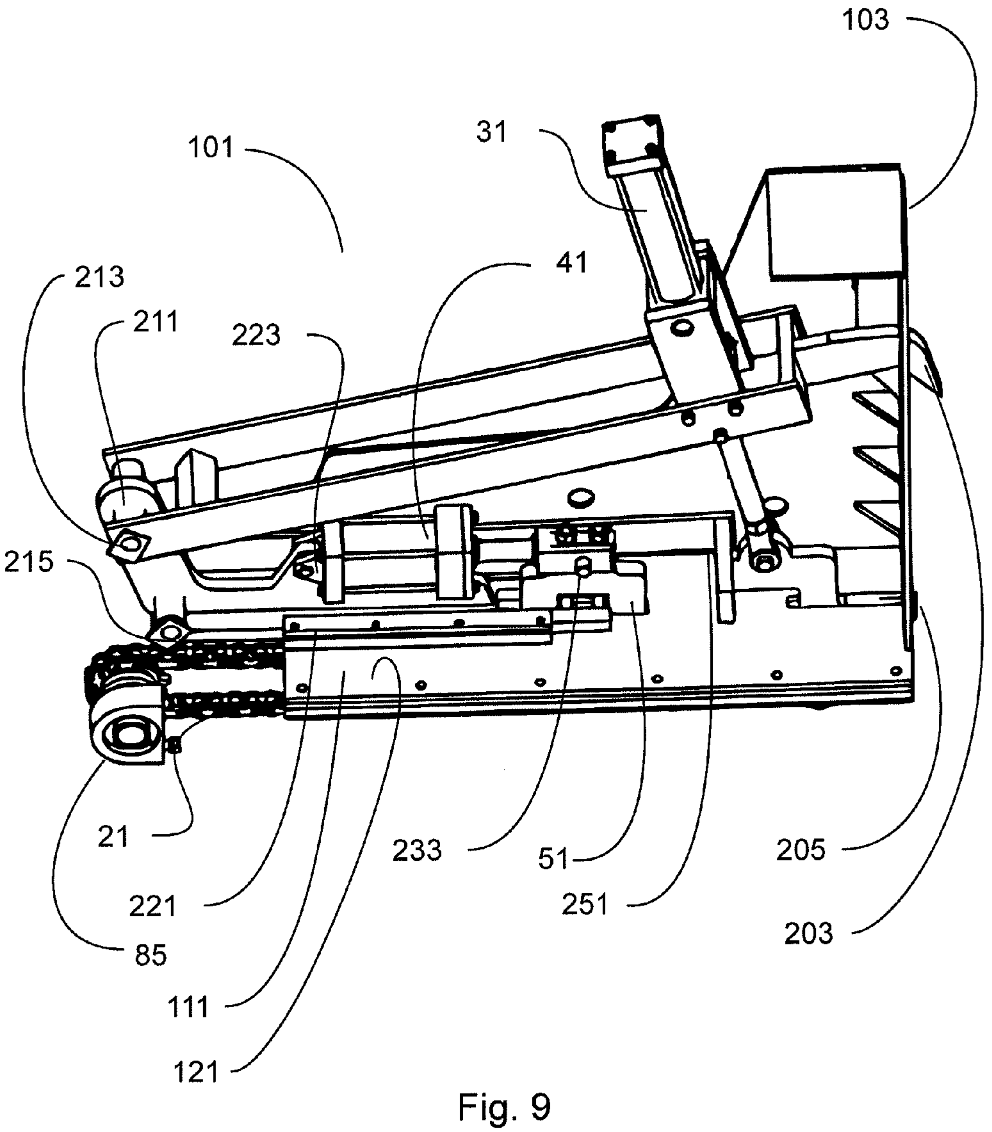
FIG. 9 is a top perspective view of the knee, chain drive and tong dog assembly shown in FIG. 8 with the lower dog left support member removed.

FIG. 9 shows a top perspective view of the knee assembly 101 showing the dogs 203, 205 in an retracted position. The right lower dog horizontal member 251 is shown but the left lower dog horizontal member is not shown for clarity. The intermediate connecting member 211, linearly slides along the knee base plate 111 allowing the dogs 203 205 to move toward and away from the knee front face 103. In the preferred embodiment, the intermediate connecting member guides 221, 223 retain the intermediate connecting member base plate 212 which is rigidly attached to the intermediate connecting member 211 and allow the horizontal linear movement of the intermediate connecting member 211 when pushed or pulled by the in/out cylinder 41. The chain 21 anchors the chain adjustment plate 51 in place. The chain 21, and also with it, the knee 101 and dogs 203, 205, can be moved as a unit by the operator to a desired position by a hydraulic motor 85.

Figure 10:
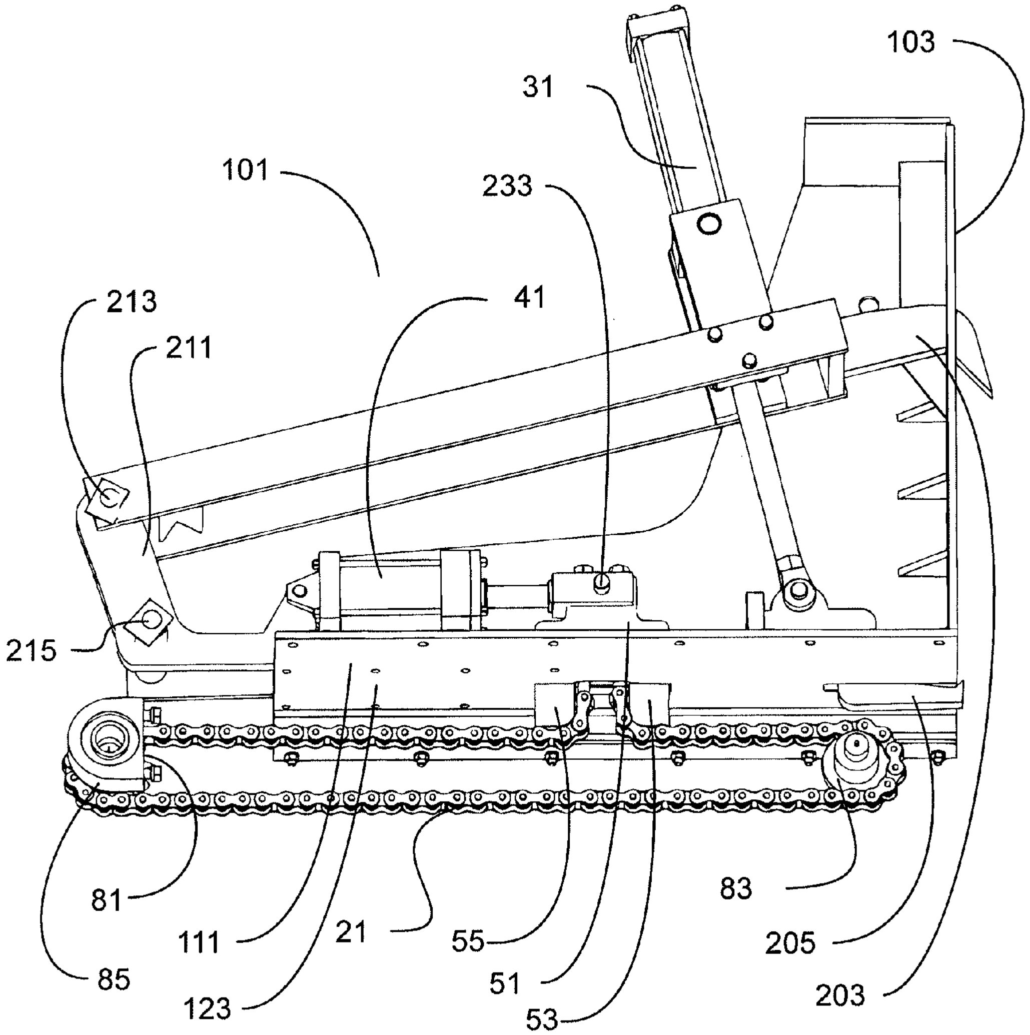
FIG. 10 is a bottom perspective view of the knee, chain drive and tong dog assembly shown in FIG. 8.

FIG. 10 shows a bottom perspective view of the knee assembly 101 with the intermediate connecting member base plate, left lower dog horizontal member and right lower dog horizontal member removed for clarity. The chain adjustment plate is shown having a front lower protrusion 53 and a rear lower protrusion 55 extending down below the knee wear plate. The protrusions 53, 55 allow the chain to maintain a linear relationship with the top of the sprockets 81, 83 allowing the chain to horizontally move the knee toward or way from the saw blade or saw set.

Figure 11:
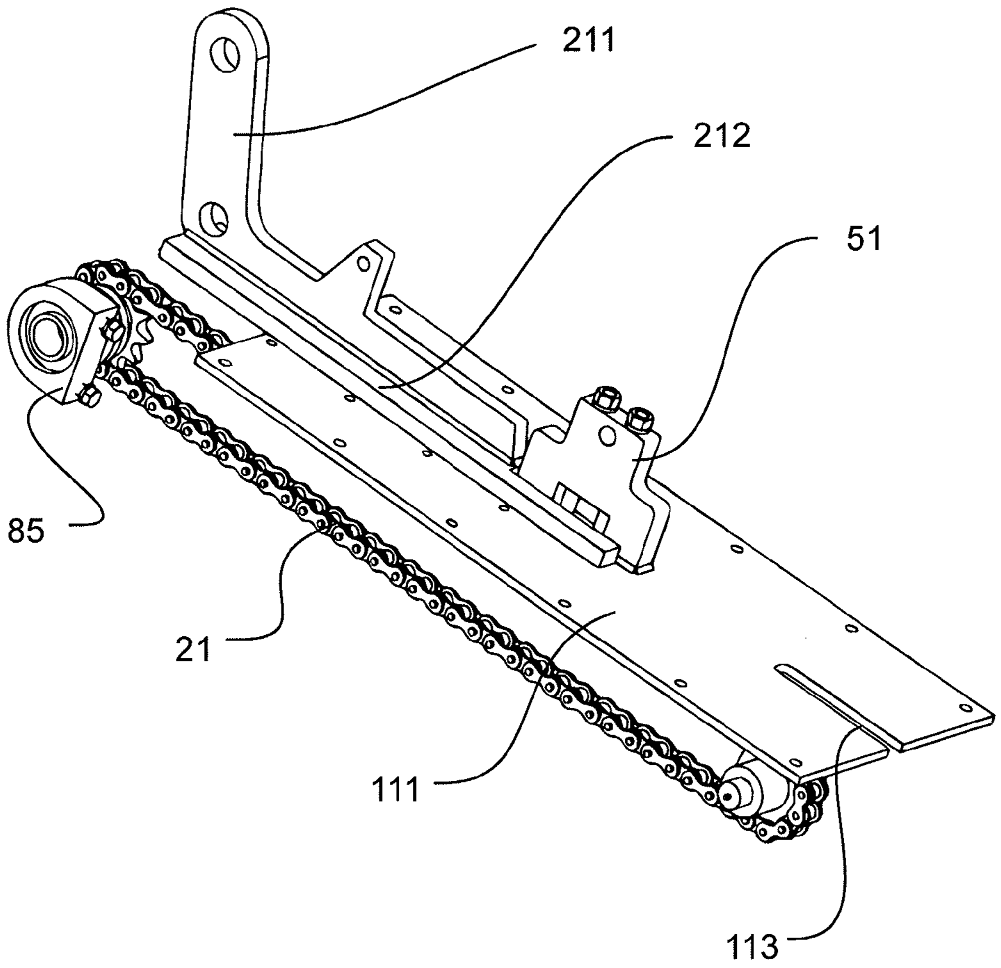
FIG. 11 is a top perspective view of the knee, chain drive and tong dog assembly with the lower dog left support member, tong dog slide plate and guides removed.

FIG. 11 shows a top perspective view of the knee base plate 111, intermediate connecting member 211, intermediate connecting member base plate 212, chain tension adjustment plate 51, chain 21, and hydraulic motor 85. The intermediate connecting member base plate 212 straddles the chain tension adjustment plate 51 giving the intermediate connecting member 211 additional stability. A slot 113 in the knee wear base plate 111 allows the lower dog to retract flush with the knee face while also open to a position at or below the knee wear base plate 111.

Figure 12:
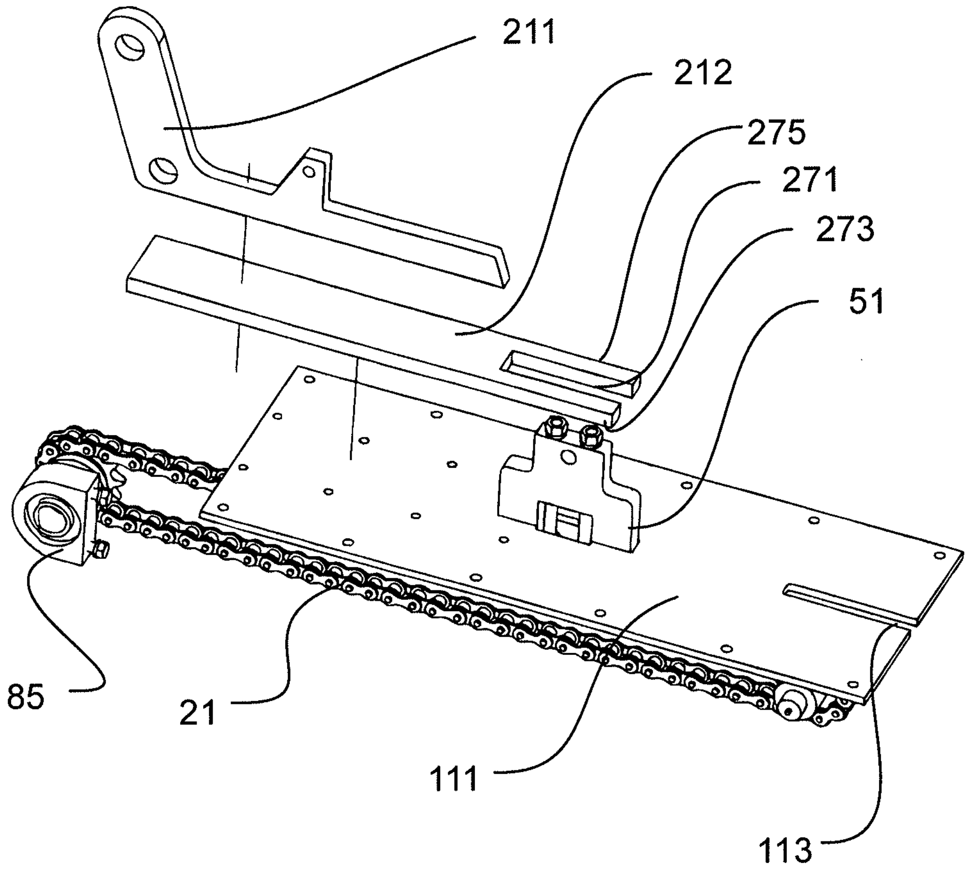
FIG. 12 is a top front exploded perspective view of the lower tong dog slide plate, lower knee support plate, chain drive and tensioning plate.

FIG. 12 shows a top perspective assembly exploded view of the knee base plate 111, intermediate connecting member 211, intermediate connecting member base plate 212, chain tension adjustment plate 51, chain 21, and hydraulic motor 85. The intermediate connecting member base plate 212 possesses a slot 271. The slot 271 results in the left side 273 and right side 275 of the intermediate connecting member base plate 212 to extend past the chain tension adjustment plate 51.

Figure 13:
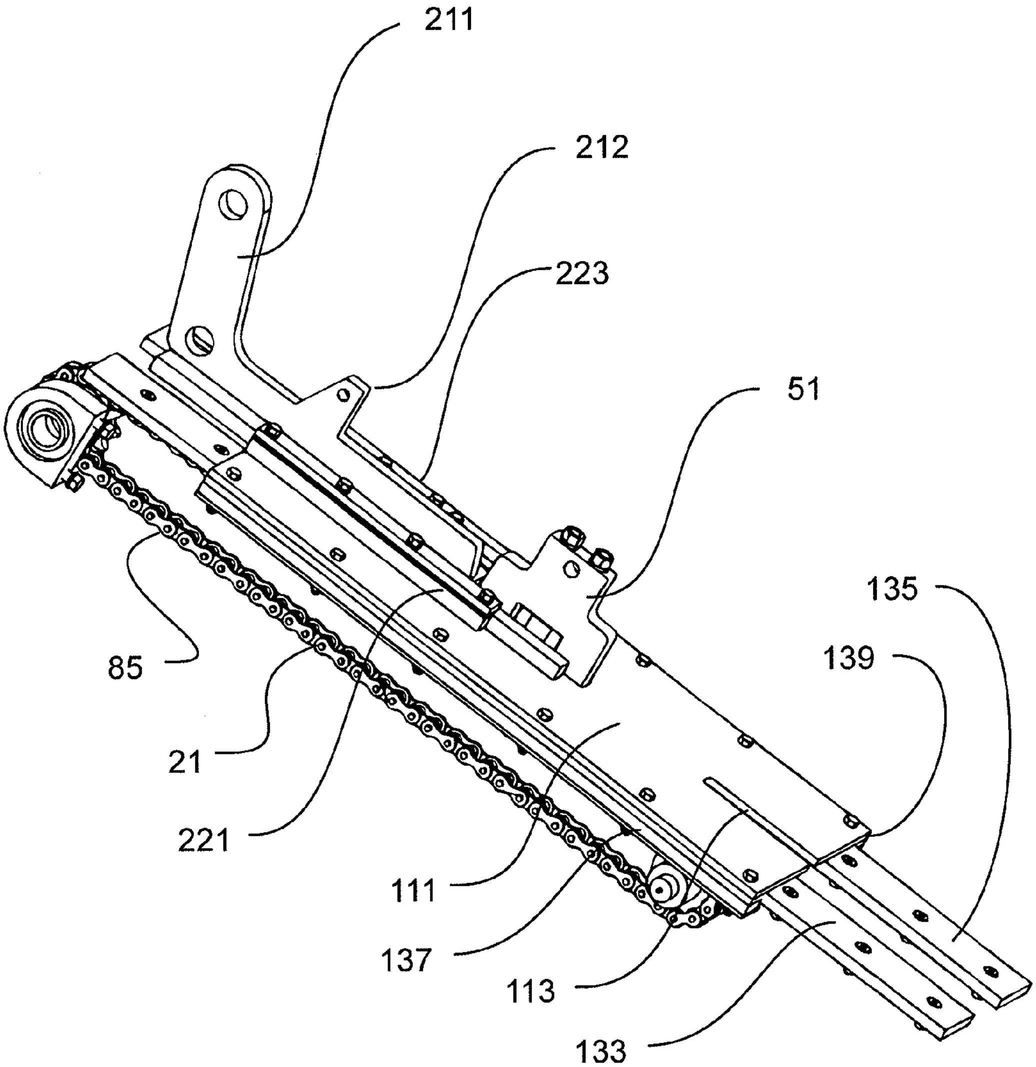
FIG. 13 is a top front perspective view of the lower tong dog slide plate, lower knee support plate, lower knee slide plates, chain drive and tensioning plate.

FIG. 13 shows a top perspective view of the knee base plate 111, intermediate connecting member 211, intermediate connecting member base plate 212, chain tension adjustment plate 51, intermediate connecting member base plate left and right guides 221, 223, left and right knee wear plates 133, 135 and left and right knee wear plate guides 137, 139. The intermediate connecting member left guide 221 and right guide 223 restrict the movement of the intermediate connecting member 211 to a linear motion towards and away from the knee front face 103. The knee wear base plate 111 is restricted to a linear movement toward and away from the saw blade by a left knee wear plate guide 137 and a right knee wear plate guide 139 which capture a left wear plate 133 and a right wear plate 135.

Figure 14:
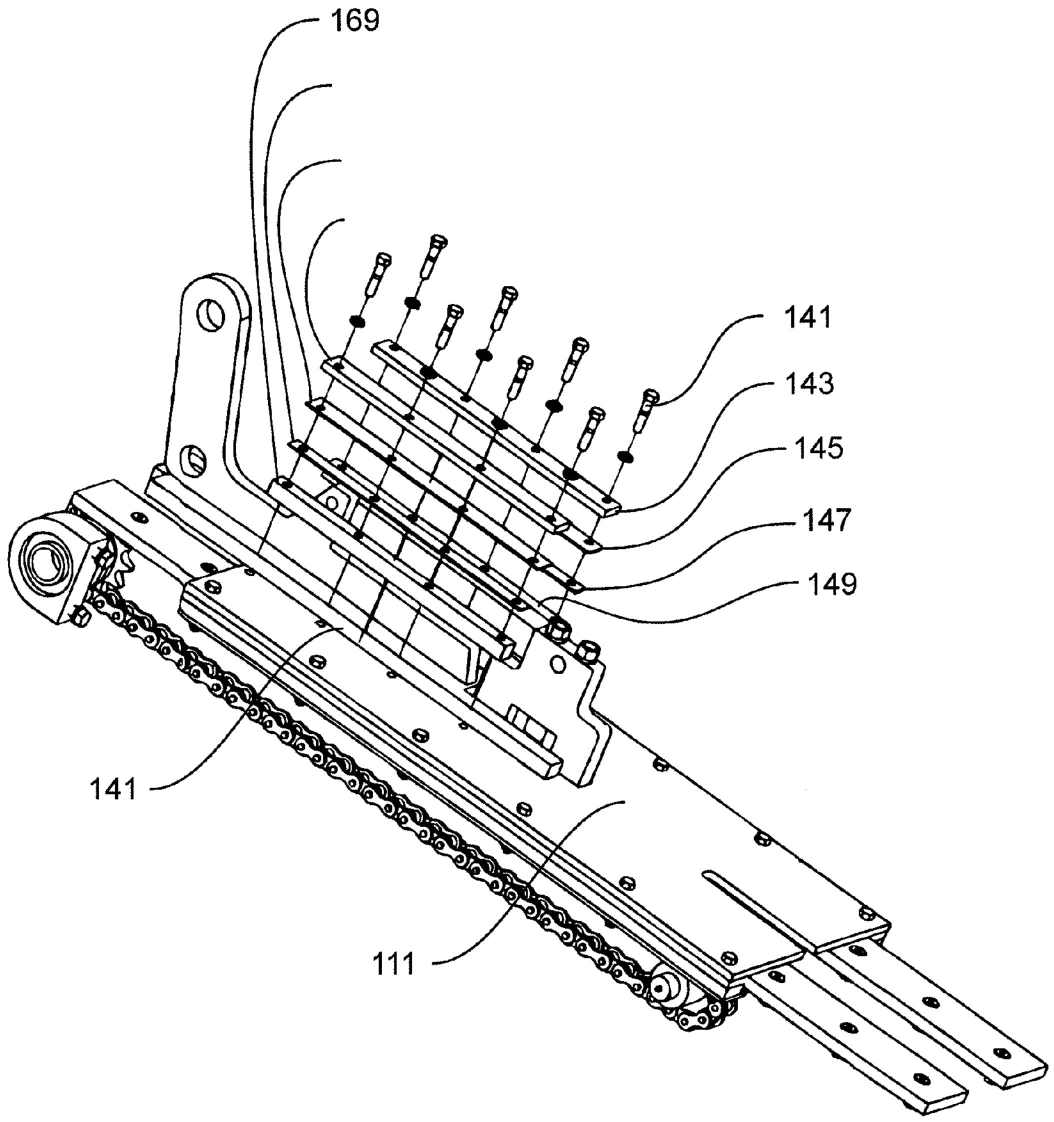
FIG. 14 is a top front exploded perspective view of the lower tong dog slide plate, lower knee support plate, lower knee slide plates, chain drive and tensioning plate.

FIG. 14 shows an exploded assembly perspective view of the knee base plate and 111 and left and right intermediate connecting member guides 221, 223. The intermediate connecting member guides 221, 223 are secured to the knee base plate by bolts 141 through the top restraining members 143, 163, allowing for disassemble for maintenance or repair of wear surfaces 145, 165 or addition and/or removal of shim members 147, 167 to lateral restraining members 149, 169. The guides 221, 223 capture the intermediate connecting member base plate 141 preventing unwanted lateral or vertical movement or rotation while allowing horizontal movement toward or away from the knee front face relative to the knee wear base plate 111 as permitted by the in/out cylinder.

Figure 15:
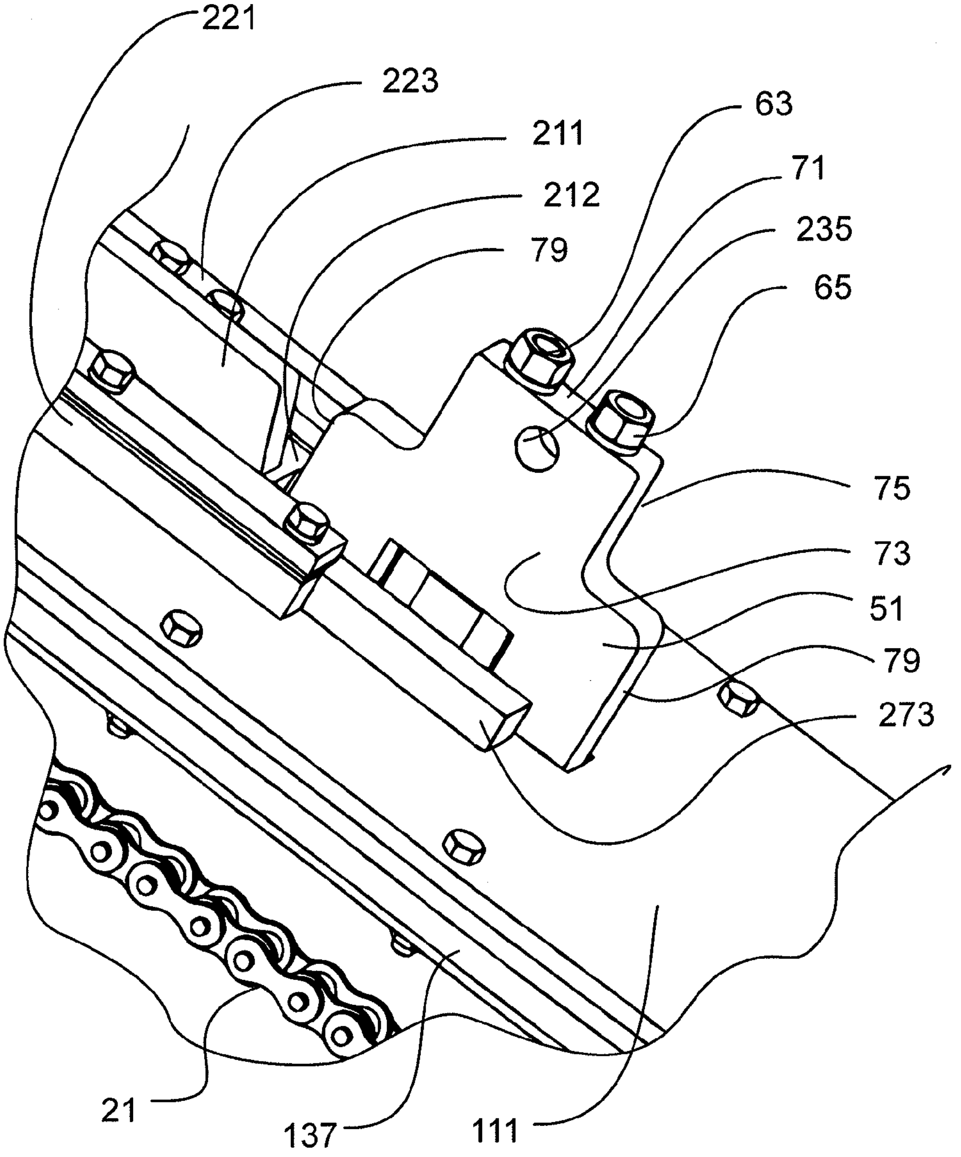
FIG. 15 shows a partial view of the tensioning plate and lower tong dog slide plate.

FIG. 15 shows a perspective partial close up view of the knee; chain tension adjustment plate 51, knee wear base plate 111 and intermediate connecting member 211, intermediate connecting member base plate 212 and intermediate connecting member guides 221,223. The chain tensioning plate 51 possesses a first chain tensioning screw 63 and a second chain tensioning screw 65. The two screws 63, 65 allow for adjustment of the chain 21 tension and also for horizontal adjustment of the knees. The screws 63, 65 are vertically positioned down through the chain adjustment plate top surface 71 allowing the user to easily access the tension screws from above and easily make alternating incremental adjustments to the screws, such as loosening one while tightening the other to adjust the knee's horizontal position while maintaining proper tension. The proximity of the screws 63, 65 to each other and their vertical orientation speeds up and simplifies chain 21 adjustment.

The chain tension adjustment plate 51 possesses an aperture 235 for receiving a pin connection to the in/out cylinder. The chain adjustment plate has a left surface 73 and a right surface 75, a rear surface 77 and a front surface 79, the distance between the right and left surfaces 73, 75 being shorter than the distance between the rear and front surfaces 77, 79 creating a chain tensioning plate having a narrow profile. The narrow profile of the plate 51 enables the intermediate connecting member base plate 212 to straddle the plate 51, the intermediate connecting member base plate left side 273 and right side 275 extending to either side opposing the left and right surfaces 73, 75 of the plate 51 respectively. This arrangement creates a stronger intermediate base plate 212 with a larger wear surface area and less undesired play, or looseness. The narrow chain tensioning plate allows additional room for a larger in/out cylinder, necessary for adequate force to move the dogs in/out and hold a log in tapered position not possible with prior art designs.

Figure 16:
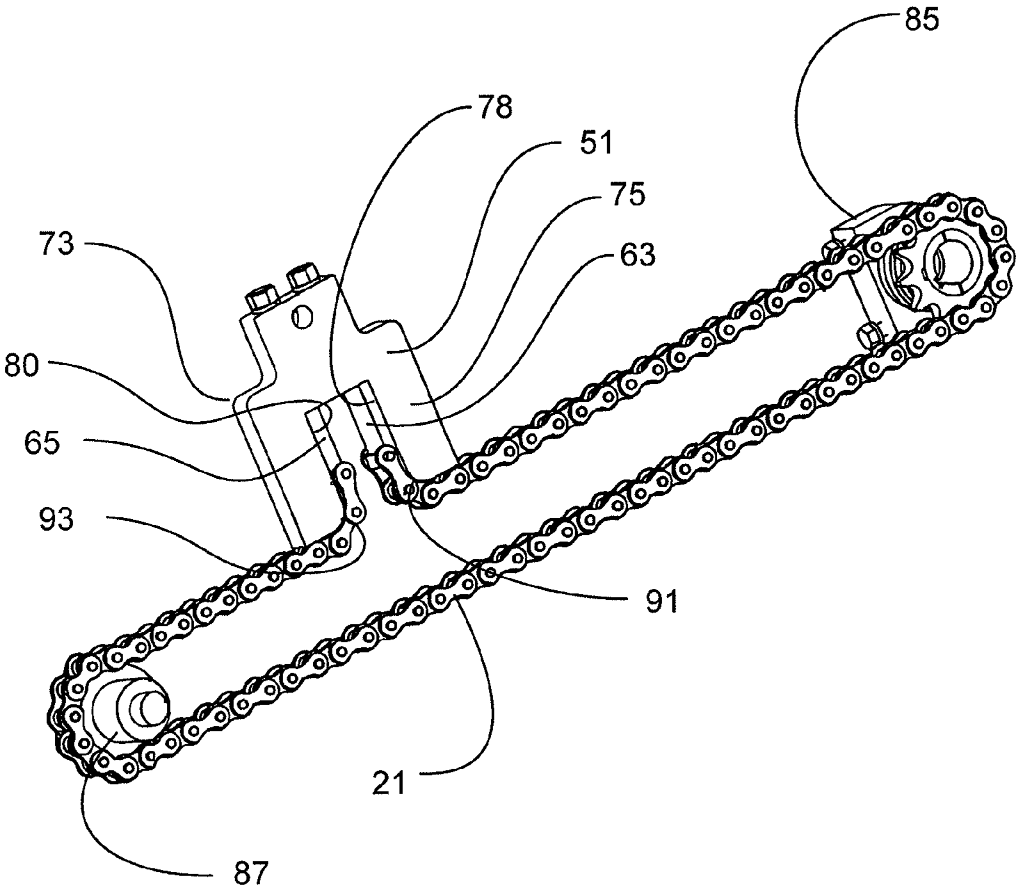
FIG. 16 shows a side perspective view of the tensioning plate and chain.
Figure 17:
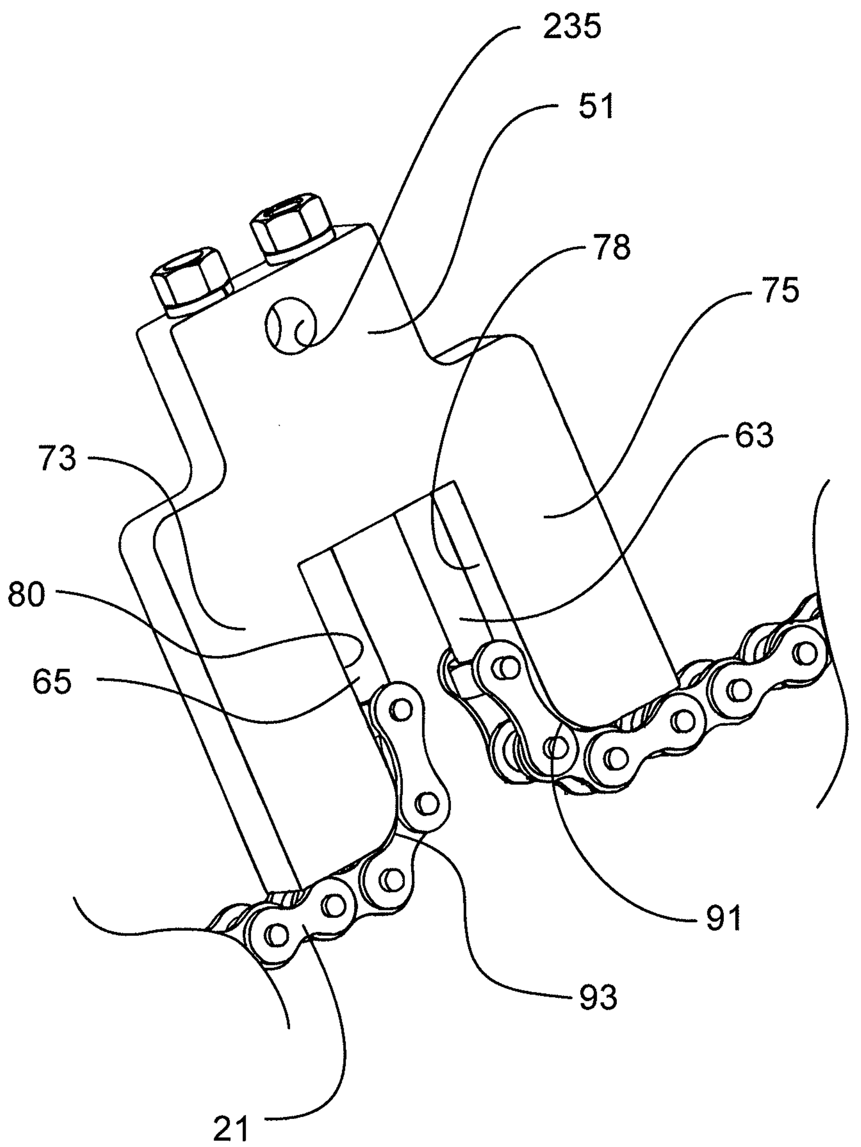
FIG. 17 shows a partial view of the tensioning plate and chain.

FIGS. 16 and 17 show the chain tension adjustment plate 51 (which is preferably, though not necessarily a $\frac{3}{8}^{th}$ inch steel block), chain 21 (which is preferably, though not necessarily a #100 chain), idle sprocket or pulley 87, and rotary actuator 85. The tension screws 63, 65 protrude through the top 71 of the chain tension adjustment plate 51 providing chain position adjustment and tension adjustment. The front inner surface 80 of the chain tension adjustment plate 51 possesses a radius 93 allowing the chain to bend along the surface of the radius 93 to allow adjustment. Likewise, the rear inner surface 78 possesses a radius 91 allowing the chain to bend along the surface of the radius 91 to allow the chain to slide along the surface of the radius 91 for adjustment. The chain tension adjustment plate 51 further possesses an aperture 235 for receiving a pin connection to the in/out cylinder.

The invention enables a sawyer to quickly and efficiently cut logs at a desired taper without the aid of a more complex, expensive machine by allowing the sawyer to utilize the knee positioning actuator to precisely and quickly adjust the taper of the saw cut.

Figure 18:
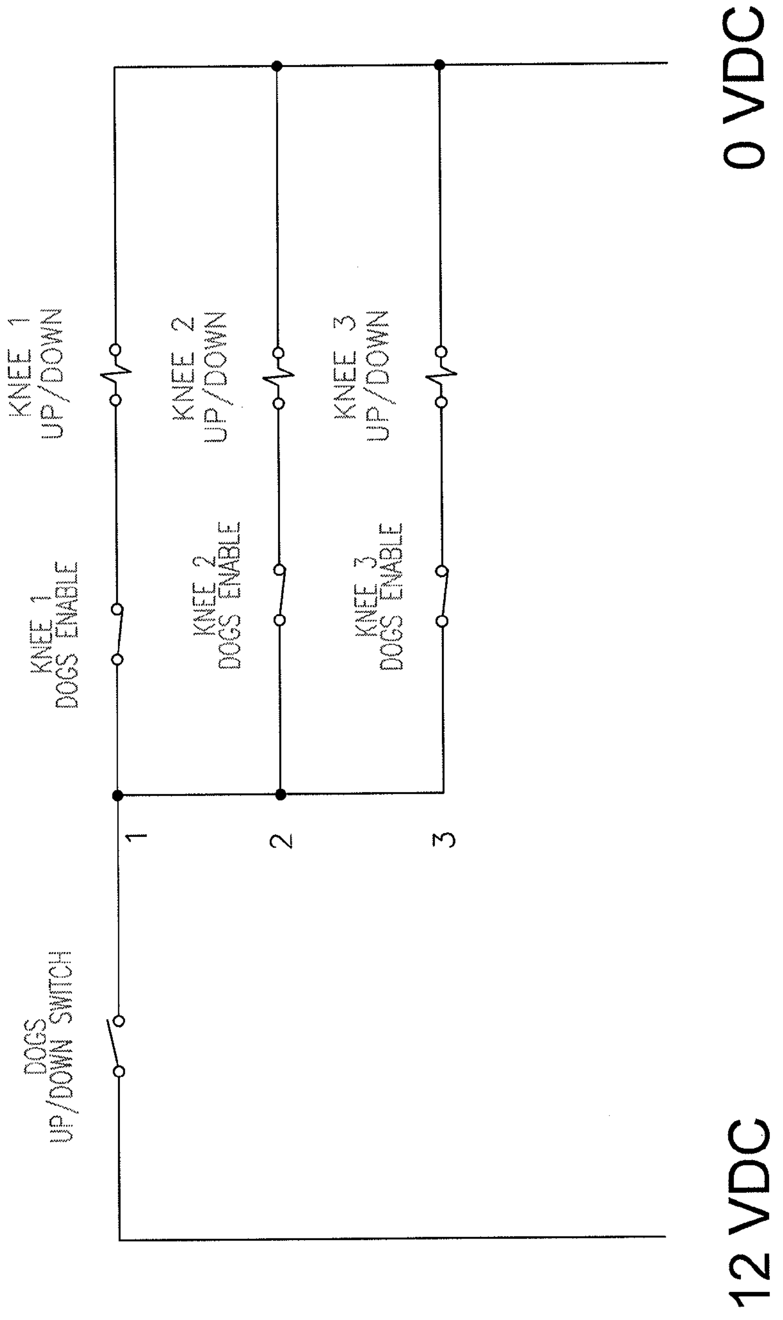
FIG. 18 shows is an electric schematic for the dog control circuit used when tapering.

In the preferred embodiment of the invention, each dog, or set of dogs, on a single knee is able to be controlled independent of the dog, or set of dogs, on the other knees. The user is able to control the movement of the dogs on/off switches, along with a jog button to taper the log therefore eliminating the complex mechanical assemblies used to typically taper the log. With the present invention the sawyer tapers the log by:

FIG. 18 is the electric schematic for the dog control circuit used when tapering. Sawyer presses dogs up/down toggle button to cause dogs to open on each knee. On the knee closest to the large end of the log, turn dog control switch off which disables the up/down control of the particular dog selected and causes the dog to close and clamp the large end of the log.

To taper the position of the log, the sawyer jogs away from the saw. The small end of the log, being unclamped (not dogged) pulls away from the knee face as the large (clamped) end is pulled back.

When the sawyer is satisfied with the taper position of the log, the sawyer turns the dogs up\down switch off which causes the dog(s) closest to the small end of the log to come down and clamp the log in place. The small end of the log will be clamped in a position away from the face of the knee which will provide the desired taper.

The sawyer saws the desired number of boards and then flips the dog enable switch that was previously turned off back on. Now the sawyer presses the dogs up/down switch which causes all the dogs to come up. The sawyer turns the log and repeats the process on the second axis of the log if desired.

The inventive system is unique because it does not use any mechanical mechanism to taper the log by tapering the knees relative to each other. Such a system utilizes the same air cylinder to move the dogs in/out and for the variable tapering of the log and the knees always stay in line during utilization. The overall system furthermore also uses simple on/off switches to control the up/down dogs and the forward/reverse jog function to position the knees. Thus, the inventive carriage dog design, when utilizing an adequately sized air cylinder to move the dogs from the "in" position to the "out" position, is critical to this tapering method, ostensibly because it provides ample stiffness to the held tapered log so as not to give or release to any appreciable degree when using the knees to position the log and hold it in place while sawing the subject log. In this manner, then, the overall system improves significantly on the current state of the art devices through the ability to selectively maneuver the subject log to any taper position on demand through the chain drive component present herein.

What is claimed is:

1. A sawmill carriage capable of adjusting the taper angle to a desired taper of a log to be cut comprising:
- a plurality of horizontally movable knees, each knee having a vertical face opposing said log, said knees mechanically linked to move as a unit;
- a plurality of tong dogs, each said tong dog comprising of an upper dog and a lower dog;
- a knee base plate having a horizontal top surface and a horizontal bottom surface;
- a chain adjustment plate, having a top surface, a rear surface and a front surface, a portion of said chain adjustment plate extending vertically above said knee base plate horizontal top surface and a portion of said chain adjustment plate extending vertically below said knee base plate horizontal bottom surface, said chain adjustment plate securely attached to said knee base plate;
- an in/out dog cylinder; said cylinder able to be retracted or extended to move a said tong dog horizontally toward and away from said knee vertical face, a first end of said in/out dog cylinder attached to said chain adjustment plate, a second end of said in/out dog cylinder attached to said tong dogs;
- a drive chain having a first end and a second end to horizontally jog said knee horizontally and perpendicular to the length of said log, said first end of said drive train attached to a first adjustment bolt, said first adjustment bolt having an axis oriented vertically;
- whereas said first adjustment bolt may be tensioned, thereby removing slack from said drive chain.

2. The sawmill carriage of claim 1 further comprising:
- a second adjustment bolt wherein said drive chain second end is attached to said second adjustment bolt, said adjustment bolt having an axis oriented vertically;
- whereas said first or second adjustment bolts may be tensioned and the other loosened, thereby allowing small adjustments of the horizontal position of the knee.

3. The sawmill carriage of claim 2 wherein said chain adjustment plate further comprises:
- a chain tension adjustment plate front lower protrusion;
- a chain tension adjustment plate rear lower protrusion;
- a chain tension adjustment plate front inner surface;
- a chain tension adjustment plate rear inner surface;
- whereas said front inner surface and said rear inner surface oppose each other and said drive chain first end is positioned adjacent to said front inner surface and said drive chain second end is positioned adjacent to said rear inner surface.

4. A knee assembly for a sawmill carriage to aid in the positioning of a log for cutting at a desired taper, said knee assembly comprising:
- a vertical face opposing said log;
- a pair of dogs, a first upper dog and a second lower dog;
- a knee base plate having a horizontal top surface and a horizontal bottom surface;
- a chain adjustment plate, having a top surface, a rear surface and a front surface, a portion of said chain adjustment plate extending vertically above said knee base plate horizontal top surface and a portion of said chain adjustment plate extending vertically below said knee base plate horizontal bottom surface, said chain adjustment plate securely attached to said knee base plate;

an in/out dog cylinder; said cylinder able to be retracted or extended to move a said tong dog horizontally toward and away from said knee vertical face, a first end of said in/out dog cylinder attached to said chain adjustment plate, a second end of said in/out dog cylinder attached to said tong dogs;

a drive chain having a first end and a second end to horizontally jog said knee horizontally and perpendicular to the length of said log, said first end of said drive train attached to a first adjustment bolt, said first adjustment bolt having an axis oriented vertically;

whereas said first adjustment bolt may be tensioned, thereby removing slack from said drive chain.

* * * * *